United States Patent [19]
Collin et al.

[11] Patent Number: 5,544,959
[45] Date of Patent: Aug. 13, 1996

[54] REMOVABLE KEYPAD FOR AN ELECTRONIC CIRCUIT BREAKER

[75] Inventors: Edwin J. Collin, Southington; Robert C. Turton, Burlington, both of Conn.

[73] Assignee: General Electric Company, New York, N.Y.

[21] Appl. No.: 380,773

[22] Filed: Jan. 30, 1995

[51] Int. Cl.⁶ .................................................. H01H 9/02
[52] U.S. Cl. .......................................... 335/202; 200/295
[58] Field of Search ............................ 335/18, 202, 132, 335/200; 200/295, 305

[56] References Cited

U.S. PATENT DOCUMENTS

| | | |
|---|---|---|
| 4,539,541 | 9/1985 | Bharteey et al. ................ 335/132 |
| 4,589,052 | 5/1986 | Dougherty . |
| 4,870,531 | 9/1989 | Danek . |

*Primary Examiner*—Lincoln Donovan
*Attorney, Agent, or Firm*—Richard A. Menelly

[57] ABSTRACT

A removable keypad controls the electronic trip unit used within state-of-art electronic circuit breakers. The keypad allows inputting and displaying relevant circuit interruption information. Unauthorized access to the trip unit settings is prevented by blocking off the keypad "ENTER" key while still allowing access to the keypad's remaining function keys.

4 Claims, 1 Drawing Sheet

REMOVABLE KEYPAD FOR AN ELECTRONIC CIRCUIT BREAKER

BACKGROUND OF THE INVENTION

U.S. Pat. No. 4,589,052 entitled a "DIGITAL I²T PICKUP, TIME BANDS AND TIMING CONTROL CIRCUITS FOR STATIC TRIP CIRCUIT BREAKERS" discloses a solid state circuit interrupter employing a digital electronic trip unit. Such electronic trip units are used in circuit interrupters for acting on a number of programmed parameters to interrupt a protected circuit in a timely manner. One such electronic trip unit which allows user interaction for selecting and viewing trip parameters is found within U.S. Pat. No. 4,672,501 entitled "Circuit Breaker and Protective Relay Unit."

U.S. Pat. No. 4,870,531 entitled "Circuit Breaker with Removable Display and Keypad" describes an electronic circuit interrupter which contains a keypad and display device capable of displaying the stored circuit breaker settings. The keypad and display removably connects with the electronic trip unit within the circuit interrupter by means of a plug-in connector.

Such keypad and display units provide display capability for all possible circuit interrupter options while displaying only those parameters for which the electronic trip unit is configured by means of software located within the trip unit microprocessor. However, with such keypad and display units, the stored trip unit settings are subject to tampering since the exposed keypad actuating buttons are accessible to unauthorized personnel.

It would be advantageous to prevent unauthorized user access to the trip unit settings in order to preserve the distribution system coordination. One purpose of this invention is to prevent the changing of trip unit settings by unauthorized personnel while still allowing authorized operator access.

SUMMARY OF THE INVENTION

A circuit breaker containing an electronic trip unit interfaces with a removable digital keypad and display unit. The digital keypad and display unit provides a user-interface to display selected trip unit parameters and to initially enter the trip unit settings. The trip unit settings are later protected against unauthorized access by means of a transparent shield containing holes through which selected keys on the keypad are accessed. Access to the "ENTER" key to change the trip unit settings requires breaking a seal and a wire to remove the transparent shield.

DESCRIPTION OF THE PREFERRED EMBODIMENT

Figure 1:
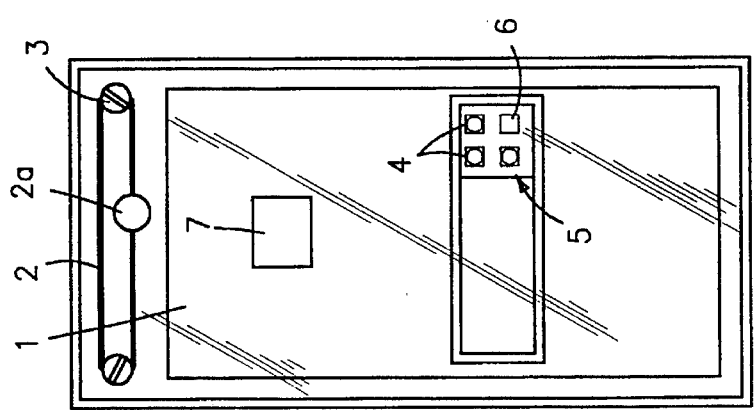
FIG. 1 is a top plan view of a circuit breaker trip unit containing a keypad and display which incorporates the window shield in accordance with the invention.

FIG. 1, depicts a circuit breaker with a keypad display and rating plug 7. The circuit breaker includes an electronic trip unit such as described in the aforementioned U.S. Pat. No. 4,870,531. Keypad tamper resistance is provided by the transparent shield 1 and seal and wire 2 used with mounting screws 3 to limit access to keypad to the function buttons 4 only. The "ENTER" button 6 may not be accessed with the shield 1 in place since there is no access hole directly above the "ENTER" key through the shield. The holes 5 through the shield provide an access means to the function buttons 4.

Figure 2:
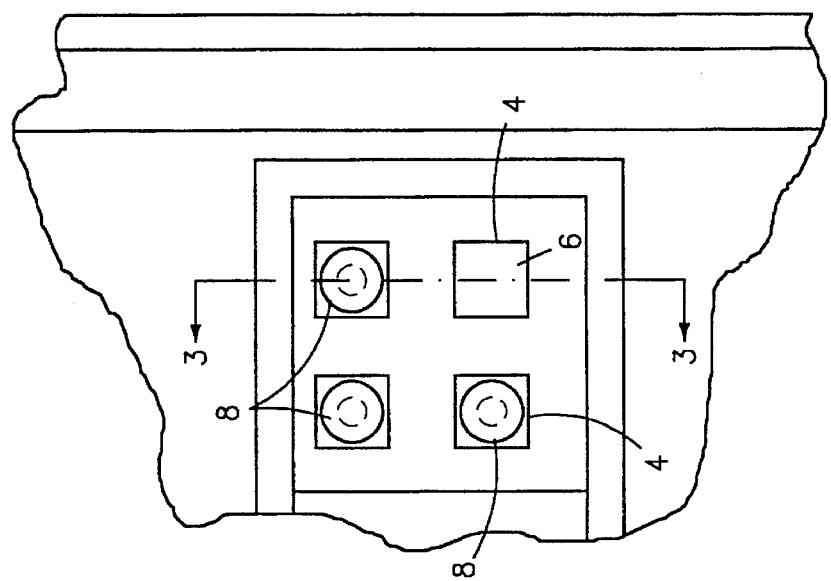
FIG. 2 is an enlarged top view of the keypad of FIG. 1 depicting keypad operating buttons.

As shown in FIG. 2, the keys on the keypad 4 are accessed through the holes 5, shown in FIG. 1, by means of corresponding push buttons 8. This restricted access is desirable as a means to improve the circuit breaker keypad's tamper resistance while providing full access to the user-interface keys of the keypad without allowing access to the keypad "ENTER" keys.

Figure 3:
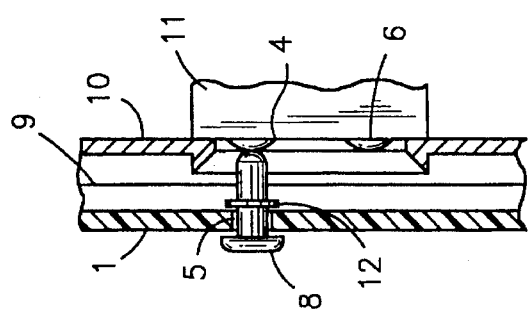
FIG. 3 is an enlarged side sectional view of the keypad of FIG. 2 through the 3—3 plane.

As described in the aforementioned U.S. Pat. No. 4,870,531, the buttons 4 and the "ENTER" button 6 could be accessed by inserting a pen or the like through holes 5 allowing unauthorized access to the keypad. Operation of the protected keypad in accordance with the invention, is best seen by now referring to FIG. 3, wherein push button 8 is depressed to make contact with the corresponding key 6 on the trip unit keypad 11. The keypad transparent shield 1 mounts on the top of the ridge 9 preventing access to the trip unit 10 and keypad display 11. The keypad "ENTER" button, as shown in FIG. 1, can not be accessed without a push button 8, which is attached to the shield 1 and held into place by clip 12 for operation of the function buttons 6 only.

We claim:

1. An electronic circuit breaker removable keypad and display unit comprising:
   a keypad enclosure including a plurality of function keys and an "ENTER" key;
   a display arranged within said enclosure and electronically connected with an electronic trip unit;
   a keypad shield having first holes corresponding to said function keys;
   a plurality of push-buttons extending through said first holes into contact with said function keys; and
   a second hole corresponding to said "ENTER" key, said second hole having a blocking means preventing access to said "ENTER" key.

2. The keypad and display unit of claim 1 wherein said shield is attached to a corresponding trip unit by mounting screws and sealing wire.

3. The keypad and display unit of claim 1 wherein said push buttons are clamped to said shield by clips.

4. The keypad and display unit of claim 1 wherein said shield prevents access to said "ENTER" key unless mounting screws and sealing wire are removed.

\* \* \* \* \*